(12) United States Patent
Kucherawy

(10) Patent No.: US 7,058,687 B2
(45) Date of Patent: *Jun. 6, 2006

(54) E-MAIL SYSTEM WITH METHODOLOGY FOR ACCELERATING MASS MAILINGS

(75) Inventor: Murray Kucherawy, San Francisco, CA (US)

(73) Assignee: Sendmail, Inc., Emeryville, CA (US)

( * ) Notice: Subject to any disclaimer, the term of this patent is extended or adjusted under 35 U.S.C. 154(b) by 695 days.

This patent is subject to a terminal disclaimer.

(21) Appl. No.: 09/863,941

(22) Filed: May 22, 2001

(65) Prior Publication Data

US 2003/0028580 A1 Feb. 6, 2003

Related U.S. Application Data

(60) Provisional application No. 60/281,313, filed on Apr. 3, 2001.

(51) Int. Cl.
*G06F 15/16* (2006.01)
*G06F 9/46* (2006.01)

(52) U.S. Cl. ........... 709/206; 718/107

(58) Field of Classification Search ......... 370/60, 370/229–240, 351–360, 395.1; 709/224, 709/251–253; 718/100–108; 719/313–319
See application file for complete search history.

(56) References Cited

U.S. PATENT DOCUMENTS

| | | | | |
|---|---|---|---|---|
| 5,463,620 A | * | 10/1995 | Sriram | 370/412 |
| 5,937,162 A | * | 8/1999 | Funk et al. | 709/206 |
| 6,148,329 A | * | 11/2000 | Meyer | 709/206 |
| 6,502,131 B1 | * | 12/2002 | Vaid et al. | 709/224 |
| 6,658,454 B1 | * | 12/2003 | Delany et al. | 709/202 |
| 6,735,770 B1 | * | 5/2004 | Yeager et al. | 718/107 |
| 6,779,039 B1 | * | 8/2004 | Bommareddy et al. | 709/238 |
| 2002/0129127 A1 | * | 9/2002 | Romero et al. | 709/220 |

* cited by examiner

*Primary Examiner*—David Wiley
*Assistant Examiner*—Arrienne M. Lezak
(74) *Attorney, Agent, or Firm*—John A. Smart

(57) ABSTRACT

An e-mail system is described that includes a mass-mail accelerator (MMA), which is particularly suited for processing mass e-mailings. Instead of being posted to a message transfer agent (MTA), outgoing messages are instead passed to the MMA for carrying out highly parallel e-mail delivery/routing. The MMA employs a plurality of queues, which may either be general or specific. A specific queue is configured to handle only e-mail destined for a particular domain, such as the AOL.com domain; a general queue is configured to handle all other e-mail. Each queue manages a pool of MTA threads. During MMA operation, once a message has been passed to a queue, that queue examines its MTA threads to see if one is ready to accept the message. If an MTA thread is ready, the queue will assign the message to that MTA. The MTA thread proceeds to handle the work of the SMTP exchange between the MMA and the target real-world MTA (e.g., an AOL MTA). While a given MTA thread is waiting for a reply from the real-world (destination) MTA (e.g., the AOL MTA), the MMA can proceed to do other work. In this manner, the bottleneck usually encountered with processing mass e-mailings is removed.

22 Claims, 10 Drawing Sheets

E-MAIL SYSTEM WITH METHODOLOGY FOR ACCELERATING MASS MAILINGS

RELATED APPLICATIONS

The present application is related to and claims the benefit of priority of the following commonly-owned provisional application(s): application Ser. No. 60/281,313, filed Apr. 3, 2001, entitled "E-Mail System with Methodology for Accelerating Mass Mailings", of which the present application is a non-provisional application thereof. The present application is related to the following commonly-owned application(s): application Ser. No. 09/499,502, filed Feb. 7, 2000, entitled "Electronic Mail System with Improved Methodology for Processing Messages with Mailing Lists". The disclosures of each of the foregoing applications are hereby incorporated by reference in their entirety, including any appendices or attachments thereof, for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to electronic mail (e-mail) systems and, more particularly, to improved methodology for processing automated e-mail messages sent to numerous recipients.

2. Description of the Background Art

Today, electronic mail or "e-mail" is a pervasive, if not the most predominant, form of electronic communication. FIG. 1 illustrates the basic architecture of a typical electronic mail system 10. At a high level, the system includes a mail server connected over a network to various e-mail "clients," that is, the individual users of the system. More specifically, the system 10 includes one or more clients 11 connected over a network to at least one SMTP (Simple Mail Transport Protocol) server or "Message Transfer Agent" (MTA) 12a for routing e-mail. Users write, send, and read e-mail via Mail User Agents (MUA), such as Microsoft Outlook™, present at each client (computer). To send e-mail, an MUA connects to an MTA which receives the e-mail and routes it to another MTA. An intermediary MTA might forward the e-mail to yet another MTA until the e-mail reaches the destination system, where the e-mail is stored in a mailbox accessible by the recipient.

A typical e-mail delivery process is as follows. In the following scenario, Larry sends e-mail to Martha at her e-mail address: martha@example.org. Martha's Internet Service Provider (ISP) uses an MTA, such as provided by Sendmail® for NT, available from Sendmail, Inc. of Emeryville, Calif. (With a lower case "s," "sendmail" refers to Sendmail's MTA, which is one component of the Sendmail® Switch product line.)

1. Larry composes the message and chooses Send in Microsoft Outlook Express (a "Mail User Agent" or MUA). The e-mail message itself specifies one or more intended recipients (i.e., destination e-mail addresses), a subject heading, and a message body; optionally, the message may specify accompanying attachments.
2. Microsoft Outlook Express queries a DNS server for the IP address of the local mail server running sendmail. The DNS server translates the domain name into an IP address, e.g., 10.1.1.1, of the local mail server.
3. Microsoft Outlook Express opens an SMTP connection to the local mail server running sendmail. The message is transmitted to the second sendmail server using the SMTP protocol.
4. sendmail queries a DNS server for the MX record of the destination domain, i.e., example.org. The DNS server returns a hostname, e.g., mail.example.org. sendmail queries a DNS server for the A record of mail.example.org, i.e., the IP address. The DNS server returns an IP address of, for example, 127.118.10.3.
5. sendmail opens an SMTP connection to the remote mail server providing e-mail service for example.org which is also running sendmail. The message is transmitted to the sendmail server using the SMTP protocol.
6. sendmail delivers Larry's message for Martha to the local delivery agent. It appends the message to Martha's mailbox. By default, the message is stored in (e.g., using a sample file path on a UNIX system): /var/spool/mail/martha.
7. Martha has her computer dial into her ISP.
8. Martha chooses "Check Mail" in Eudora.
9. Eudora opens a POP3 (Post Office Protocol version 3, defined in RFC1725) connection with the POP3 (incoming mail) server. Eudora downloads Martha's new messages, including the message from Larry.
10. Martha reads Larry's message.

The MTA, which is responsible for queuing up messages and arranging for their distribution, is the workhorse component of electronic mail systems. The MTA "listens" for incoming e-mail messages on the SMTP port, which is generally port 25. When an e-mail message is detected, it handles the message according to configuration settings, that is, the settings chosen by the system administrator, in accordance with relevant standards such as Request For Comment documents (RFCs). Typically, the mail server or MTA must temporarily store incoming and outgoing messages in a queue, the "mail queue." Actual queue size is highly dependent on one's system resources and daily volumes.

MTAs, such as the commercially-available Sendmail® MTA, perform three key mail transport functions:

1. Route mail across the Internet to an MTA serving a different network or "domain" (since many domains can and do exist in a single network);
2. Relay mail to another MTA (e.g., 12b) on a different subnet within the same network;
3. Transfer mail from one host or server to another on the same network subnet.

To perform these functions, an MTA accepts messages from other MTAs or MUAs, parses addresses to identify recipients and domains, resolves aliases, fixes addressing problems, copies mail into a queue on its hard disk, tries to process long and hard-to-pass messages, and notifies the sender when a particular task cannot be successfully completed. The MTA does not store messages (apart from its queue) or help users access messages. It relies on other mail system components, such as message delivery agents, message stores and mail user agents (MUAs), to perform these tasks. These additional components can belong to any number of commercial or free products (e.g., POP3 or IMAP servers, Microsoft Exchange, IBM Lotus Notes, Netscape, cc:Mail servers, or the like). Because of its central role in the e-mail systems, however, the MTA often serves as the "glue" that makes everything appear to work together seamlessly.

The overall process may be summarized as follows. E-mail is routed via SMTP servers, the so-called "Mail Transfer Agents" (MTA). Users write, send, and read e-mail via Mail User Agents (MUA). To send e-mail, an MUA connects to an MTA which receives the e-mail and routes it to another MTA. An intermediary MTA might forward the e-mail to yet another MTA until the e-mail reaches the destination system, where the e-mail is stored in a mailbox accessible by the recipient.

For further description of e-mail systems, see e.g., Sendmail® for NT User Guide, Part Number DOC-SMN-300-WNT-MAN-0999, available from Sendmail, Inc. of Emeryville, Calif., the disclosure of which is hereby incorporated by reference. Further description of the basic architecture and operation of e-mail systems is available in the technical and trade literature; see e.g., the following RFC (Request For Comments) documents:

| | |
|---|---|
| RFC821 | Simple Mail Transfer Protocol (SMTP) |
| RFC822 | Standard for the Format of ARPA Internet Text Messages |
| RFC974 | Mail Routing and the Domain System |
| RFC937, RFC1081 | Post Office Protocol version 3 (POP3) |
| RFC1123 | Requirements for Internet Hosts-Application and Support |
| RFC1725 | Post Office Protocol version 3 (POP3) |
| RFC2033 | Local Mail Transfer Protocol (LMTP) |
| RFC2060, RFC2061 | Internet Message Access Protocol (IMAP) |
| RFC2246 | The TLS Protocol, version 1.0 |
| RFC2487 | SMTP Service Extension for Secure SMTP over TLS |

RFCs are numbered Internet informational documents and standards widely followed by commercial software and freeware in the Internet and UNIX communities. The RFCs are unusual in that they are floated by technical experts acting on their own initiative and reviewed by the Internet at large, rather than formally promulgated through an institution such as ANSI. For this reason, they remain known as RFCs even once they are adopted as standards. The above-listed RFC documents are currently available via the Internet (e.g., at http://www.ietf.org/rfc), the disclosures of which are hereby incorporated by reference.

Often when sending e-mail, a distribution or "mailing list" is employed to facilitate the process of sending an e-mail message to a group of people. For instance, instead of addressing an e-mail message to individual members of a recurring group, a user can instead simply define a mailing list to comprise those members. For example, the user could define a "Marketing" mailing list that specifies members of the marketing department of the user's company. Once defined, the mailing list can be used in the recipient field for an e-mail message, in lieu of listing individual members. A message sent to this distribution list goes to all recipients listed. Typically, e-mail systems provide graphical user interface facilities for managing (e.g., adding and deleting) names in a mailing list.

Expectedly, as a particular list grows larger, it becomes progressively more resource intensive and time consuming to manage and process. Although the foregoing example of a mailing list for a marketing department may comprise a comparatively small group of recipients (e.g., less than 100), a mailing list can in fact specify an extremely large group of recipients. Consider, for instance, a mailing list defined for customer support (e.g., "North American Users") for a large software company. As another example, ISPs (Internet Service Providers) typically support many domains, many lists within each domain, and many users for each list. In such a case, a given mailing list may in fact specify many thousands or even millions of recipients, leading to an incredible amount of mailing list traffic. Accordingly, there is great interest in improving the management and processing of mailing lists so that e-mail sent to mailing lists, particularly large ones, are processed in an efficient manner.

In an electronic mail system, the task of processing a mailing list usually falls to a Mailing List Manager or "MLM", such as MLM 13 for the e-mail system for FIG. 1. Upon receiving an e-mail message sent to a predefined mailing list, the system's MTA hands off the message, with the name of the list, to the system's MLM. After checking the message, the MLM enumerates the individual recipients for the list and hands the message with a list of the specific intended recipients (i.e., with the names/e-mail addresses of the specific intended recipients attached) back to the MTA for redistribution. For instance, if the message had a mailing list specifying 100 recipients, the MLM would, after finishing its work, post the message back to the MTA with each of the 100 recipients specified. Here, the MLM opens a connection (e.g., "pipe" in UNIX—a direct data feed) to the MTA. The MTA is responsible for queuing up the message, arranging for its distribution to all of the various recipients, and retrying failed deliveries.

Without further enhancement to this basic process of handling an e-mail message with a large mailing list, the MLM is handing a substantial amount of work to the MTA to do, with no real intelligence. For instance, for a message sent to a predefined mailing list of 1000 recipients, the MLM is handing to the MTA a list of 1000 tasks to do in sequence—that is, 1000 messages to queue and distribute. At the same time, MTAs tend not to be very good at parallel delivery of a single message. Therefore, the approach commonly employed by MTAs is to do the tasks in series, one at a time. However, that approach incurs the penalty of increased delivery time due to network latency and/or system load.

Apart for the above one-to-many problem, an analogous problem concerns an e-mail that needs to go to a very large number of people where the e-mail's content or body is not constant but, instead, is customized for a given recipient. In such a case, one has millions of people who are intended recipients of messages that vary in content (i.e., message body)—that is, a scenario presenting a multitude of one-to-one relationships.

Present-day mass-mailing advertisers face such a problem. Doubleclick, for example, employs a "Composer" program to create customized mass e-mailings (i.e., electronic mailings). The Composer's basic operation is simple. The Composer works against a large list or database of people. Each person, in turn, has signed up to receive one or more specific topics (e.g., about travel, about business, about finance, or the like) in a regular electronic mailing or newsletter. Thus, in this large database of people, everybody has different combinations of what specific information he or she really wants. Based on this user-specific information, the Composer program will compose a customized piece of e-mail for each particular user, inserting the specific pieces of information the user has requested into the e-mail message's body and possibly even using the user's real name. After the appropriate message is composed for a given target user, the Composer directs an accompanying e-mail system to send that message to the target user. The Composer program repeats this basic operation for all individuals in its database.

For a given user, the foregoing process is relatively fast. However, a mass-mailing database may contain many millions of names. When one is faced with the task of creating customized mass e-mailings for millions of users, the approach of doing one user at a time is rather inefficient. Worse, with the standard systems that are being used today, when a system sends a message, the system waits until that message is accepted, by either the final mail server for delivery, or by an intermediate mail server enroute, before the Composer can proceed to the next address. Given the massive scale in which the operation is occurring, there is of course much interest in optimizing the process.

One approach to this problem is to attempt to run the Composer with some amount of parallelism. Here, the Composer is run in such a way that the list of recipients is broken down into smaller groups for parallel processing. For example, a group of one million people may be divided into ten groups of 100,000, each group being processed in parallel (e.g., by ten Composers running in parallel). The improvements with this approach, however, are inadequate. Reasons include excessive disk I/O (input/output) and excessive e-mail queue waiting times. The significant improvements in scalability and throughput simply are not realized with such an approach.

What is needed is an e-mail system that implements parallel processing for mass mailings, with as much resource sharing and re-use, and as little disk I/O, as possible. More particularly, it is desirable to take advantage of today's multithreaded computer systems to send e-mail on one processing thread while another processing thread is waiting for either input or a reply, including streamlining the process so that there is as little waiting as possible.

GLOSSARY

DNS: Short for Domain Name System (or Service, or Server), an Internet service that translates domain names into IP addresses. Because domain names are alphabetic, they are easier to remember. The Internet, however, is really based on IP addresses. Every time one uses a domain name, therefore, a DNS service must translate the name into the corresponding IP address.

POP: Short for Post Office Protocol, a protocol used to retrieve e-mail from a mail server. Most e-mail applications (e-mail clients) use the POP protocol, although some can use the newer IMAP (Internet Message Access Protocol). There are two versions of POP. The first, called POP2, became a standard in the mid-1980's and required SMTP to send messages. The newer version, POP3, can be used with or without SMTP. Relevant RFC references include RFC937 for POP2, and RFC1081 for POP3. More modern message user agents (MUAs) use IMAP (RFC2060 and RFC2061).

SMTP: Short for Simple Mail Transfer Protocol, a protocol for sending e-mail messages between servers. Most e-mail systems that send mail over the Internet use SMTP to send messages from one server to another; the messages can then be retrieved with an e-mail client using either POP or IMAP. In addition, SMTP is generally used to send messages from a mail client to a mail server. SMTP is described in RFC821, which has been amended and/or supplemented by several other RFCs.

TCP: Stands for Transmission Control Protocol. TCP is one of the main protocols in TCP/IP networks. Whereas the IP protocol deals only with packets, TCP enables two hosts to establish a connection and exchange streams of data. TCP guarantees delivery of data and also guarantees that packets will be delivered in the same order in which they were sent. For an introduction to TCP, see, e.g., RFC 793, the disclosure of which is hereby incorporated by reference.

TCP/IP: Stands for Transmission Control Protocol/Internet Protocol, the suite of communications protocols used to connect hosts on the Internet. TCP/IP uses several protocols, the two main ones being TCP and IP. TCP/IP is built into the UNIX operating system and is used by the Internet, making it the de facto standard for transmitting data over networks. For an introduction to TCP/IP, see e.g., RFC 1180: A TCP/IP Tutorial, the disclosure of which is hereby incorporated by reference. A copy of RFC 1180 is currently available at ftp://ftp.isi.edu/in-notes/rfc1180.txt.

SUMMARY OF THE INVENTION

An e-mail system constructed in accordance with the present invention includes a composer module ("Composer"), a message transport agent (MTA), and a mass-mail accelerator (MMA). (The MTA component may be eliminated if all outgoing e-mail messages are processed by the MMA, as described below.) The Composer is a program that operates against a very large database of users to provide large-scale customized e-mail messages by combining different pieces of a message together on a per-user basis. Ordinarily, the Composer passes a given message on to an MTA that, in turn, transmits the message to the intended recipient. However, this basic operation is modified so that the Composer passes a given message on to the MMA, which serves to carry out e-mail delivery/routing for the messages that have been passed on to it. More particularly, the degree of parallelism on the MTA side of message delivery has been greatly increased.

In operation, the MMA receives input that, in turn, is fed into one or more queues. The input that is received, via SMTP, comprises outgoing messages from one or more Composers. A receiving (or "client") thread initially handles this input. In the instance that multiple Composers are connected to the MMA (i.e., multiple concurrent connections), one client thread is assigned to each incoming connection. Two types of threads are actually employed here: a "listener" thread waits for a new connection, creates a client thread, and assigns the new connection to it (and thereafter repeats), and a "client" thread is what actually interacts with the Composer beyond the initial TCP/IP handshake. The respective client thread receives the incoming e-mail message (or simply, "message") and, in turn, decides which queue from the set of queues within the MMA is appropriate to receive and process the message. Any number of queues may be supported, as desired (and as indicated by the ellipsis). The client thread that receives the message examines the configuration and state of the available queues to see which one is appropriate to receive the incoming message.

Each queue itself owns a thread that manages a list of messages. As a particular advantage, the queues themselves are configurable to either be general (generic) or be specific to a particular mail (destination) domain. For instance, a queue may be configured to handle only mail destined for the Hotmail.com domain, or configured to handle only mail destined for the AOL.com domain. A queue that is specifically configured will only handle e-mail for its specific domain and will not handle any other e-mail. In contrast, a queue may be configured to be generic or general, in which case it will handle e-mail destined for any domain which has no specific queue assigned to it. E-mail posted to a specific queue will not require a Domain Name Services (DNS) look-up, as the MMA already knows (i.e., has cached) the DNS information for the corresponding target e-mail domain. Thus, for example, e-mail destined for the AOL.com domain is posted to the AOL queue. The MMA need not look up the DNS information for the AOL.com domain as this information has already been cached as part of the setup for the AOL queue. Which queues are created is entirely dependent on the configuration which gives the customer-user (e.g., system administrator) the ability to tailor or tune for a given situation. If, for example, the system administrator knows that about 60% of outgoing e-mail for his or her company is going to AOL, then the system administrator would set up an AOL-specific queue, with corresponding resources.

Each queue manages a pool of MTA threads. During configuration of the queues, the customer's system administrator may specify the allocation of MTA threads to a given queue. For instance, a system administrator may specify a maximum and/or minimum number of MTA threads that are available to a given queue. When a given MTA thread is started, it establishes a connection out to a real MTA (e.g., remote MTA residing at a particular destination on the Internet). This connection is established using SMTP over a TCP (Transmission Control Protocol) connection. Via this connection, a given MTA thread may talk SMTP to an actual MTA out in the real world someplace (e.g., an AOL MTA).

During MMA operation, once a message has been passed to a queue, that queue examines its MTA threads to see if one is ready to accept the message. If an MTA thread is ready, the queue will assign the message to that MTA. Once a message is assigned to an MTA thread, that thread is no longer available and, thus, it marks itself as "busy" (or otherwise removes itself from a "ready" list). The MTA thread proceeds to handle the work of the SMTP exchange between the MMA and the target real-world MTA (e.g., AOL MTA). While a given MTA thread is waiting for a reply from the destination MTA (e.g., AOL MTA), the MMA can proceed to do other work. Thus, for instance, while a given message is being handled by a particular MTA thread, other incoming messages can be injected, queued, requeued, moved around, or the like, within the system. In this manner, the bottleneck usually encountered with processing mass e-mailings is removed.

DETAILED DESCRIPTION OF A PREFERRED EMBODIMENT

The following description will focus on the presently-preferred embodiment of the present invention, which is implemented in server-based software operating in an Internet-connected environment running under a server operating system, such as the Microsoft® Windows NT running on an IBM-compatible server computer. The present invention, however, is not limited to any particular one application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
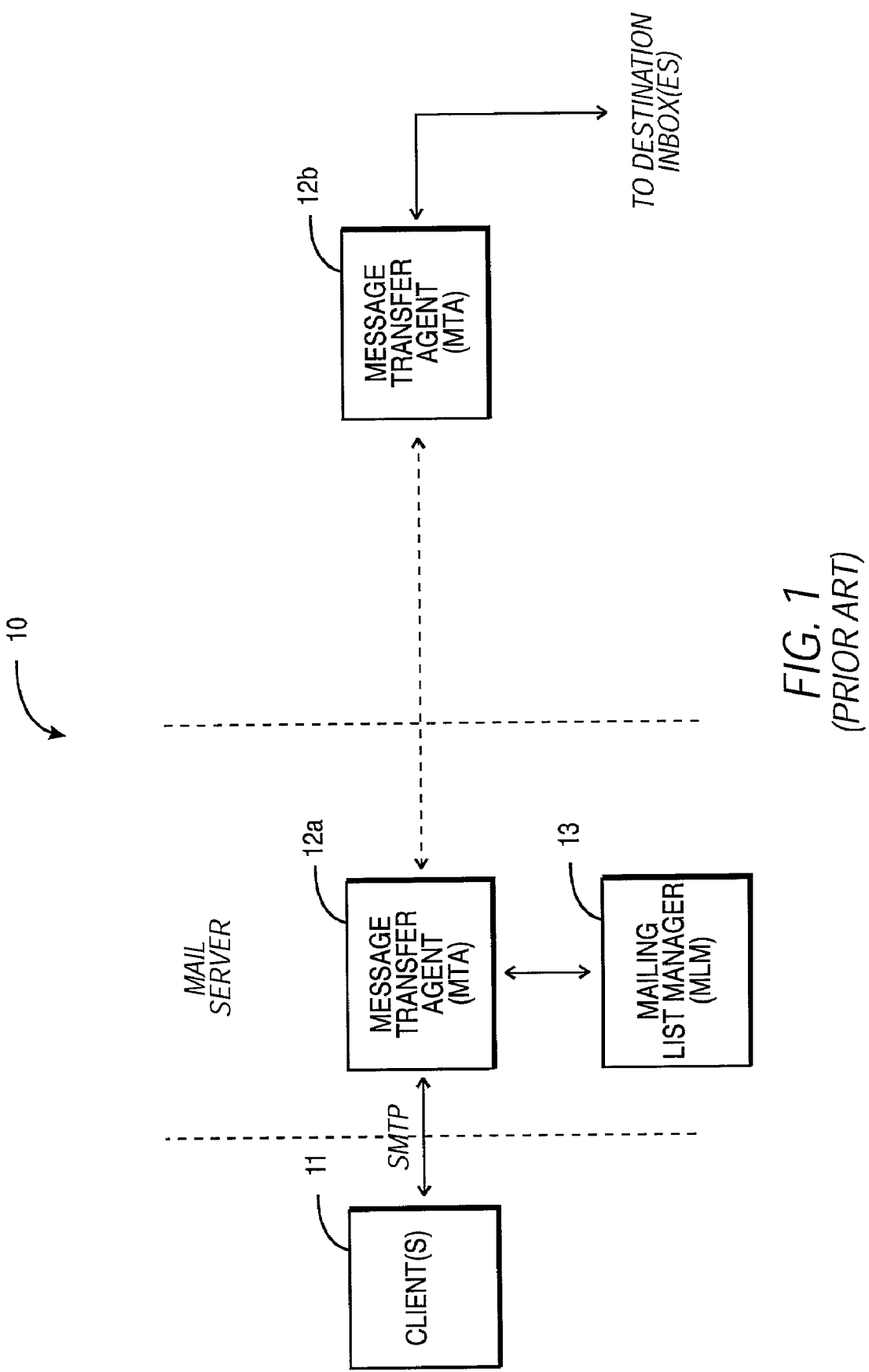
FIG. 1 is a block diagram illustrating the basic architecture of a typical electronic mail system.
Figure 2:
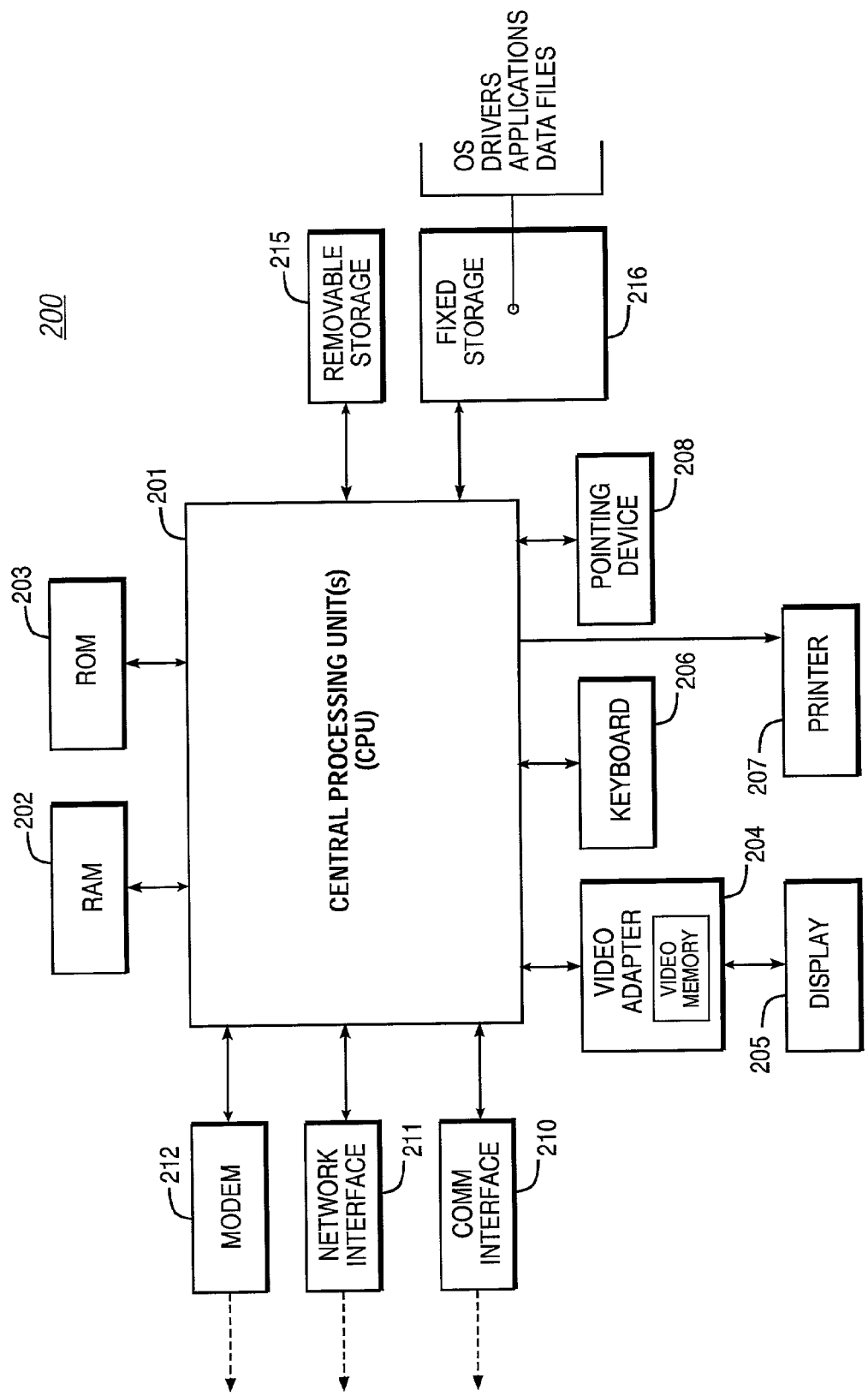
FIG. 2 is a block diagram illustrating a basic computer system suitable for implementing desktop (e.g., e-mail client) and server (e.g., mail server) components of the electronic mail system of the present invention.

The present invention may be implemented on a conventional or general-purpose computer system, such as an IBM-compatible server computer operating under a server operating system. FIG. 2 is a very general block diagram of an IBM-compatible system 200. As shown, system 200 comprises a central processor unit(s) (CPU) 201 coupled to a random-access memory (RAM) 202, a read-only memory (ROM) 203, a keyboard 206, a pointing device 208, a display or video adapter 204 connected to a display device 205, a removable (mass) storage device 215 (e.g., floppy disk), a fixed (mass) storage device 216 (e.g., hard disk), a communication port(s) or interface(s) 210, a modem 212, and a network interface card (NIC) or controller 211 (e.g., Ethernet). Although not shown separately, a real-time system clock is included with the system 200, in a conventional manner.

CPU 201 comprises a processor of the Intel Pentium® family of microprocessors. However, any other suitable microprocessor or microcomputer may be utilized for implementing the present invention. The CPU 201 communicates with other components of the system via a bi-directional system bus (including any necessary I/O controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 202 serves as the working memory for the CPU 201. In a typical configuration, RAM of sixteen megabytes or more is employed. More or less memory may be used without departing from the scope of the present invention. The read-only memory (ROM) 203 contains the basic input output system code (BIOS)—a set of low-level routines in the ROM that application programs and the operating systems can use to interact with the hardware, including reading characters from the keyboard, outputting characters to printers, and so forth.

Mass storage devices 215, 216 provide persistent storage on fixed and removable media, such as magnetic, optical or magnetic-optical storage systems, or flash memory, or any other available mass storage technology. The mass storage may be shared on a network, or it may be a dedicated mass storage. As shown in FIG. 2, fixed storage 216 stores a body of program and data for directing operation of the computer system, including an operating system, user application programs, driver and other support files, as well as other data files of all sorts. Typically, the fixed storage 216 serves as the main hard disk for the system.

In basic operation, program logic (including that which implements methodology of the present invention described below) is loaded from the storage device or mass storage 216 into the main (RAM) memory 202, for execution by the CPU 201. During operation of the program logic, the system 200 accepts user input from a keyboard 206 and pointing device 208, as well as speech-based input from a voice recognition system (not shown). The keyboard 206 permits selection of application programs, entry of keyboard-based input or data, and selection and manipulation of individual data objects displayed on the display screen 205. Likewise, the pointing device 208, such as a mouse, track ball, pen device, or the like, permits selection and manipulation of objects on the display screen. In this manner, these input devices support manual user input for any process running on the system.

The computer system displays text and/or graphic images and other data on the display device 205. The video adapter 204, which is interposed between the display 205 and the system, drives the display device 205. The video adapter 204, which includes video memory accessible to the CPU, provides circuitry that converts pixel data stored in the video memory to a raster signal suitable for use by a cathode ray tube (CRT) raster or liquid crystal display (LCD) monitor. A hard copy of the displayed information, or other information within the system 200, may be obtained from the printer 207, or other output device. Printer 207 may include, for instance, an HP Laserjet® printer (available from Hewlett-Packard of Palo Alto, Calif.), for creating hard copy images of output of the system.

The system itself communicates with other devices (e.g., other computers) via the network interface card (NIC) 211 connected to a network (e.g., Ethernet network), and/or modem 212 (e.g., 56K baud, ISDN, DSL, or cable modem), examples of which are available from 3Com of Santa Clara, Calif. The system 200 may also communicate with local occasionally-connected devices (e.g., serial cable-linked devices) via the communication ("comm") interface 210, which may include a RS-232 serial port, a Universal Serial Bus (USB) interface, or the like. Other devices may be connected locally via the comm interface.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Sun Solaris workstations, which are available from Sun Microsystems of Mountain View, Calif.

The above-described system 200 of FIG. 2 is presented for purposes of illustrating the basic hardware underlying desktop (e.g., e-mail client) and server computer (e.g., SMTP server) components that may be employed in the system of the present invention. Those skilled in the art will appreciate that the present invention may be implemented in any type of computer system or processing environment capable of supporting the methodologies of the present invention presented in detail below.

B. Basic System Software

Figure 3:
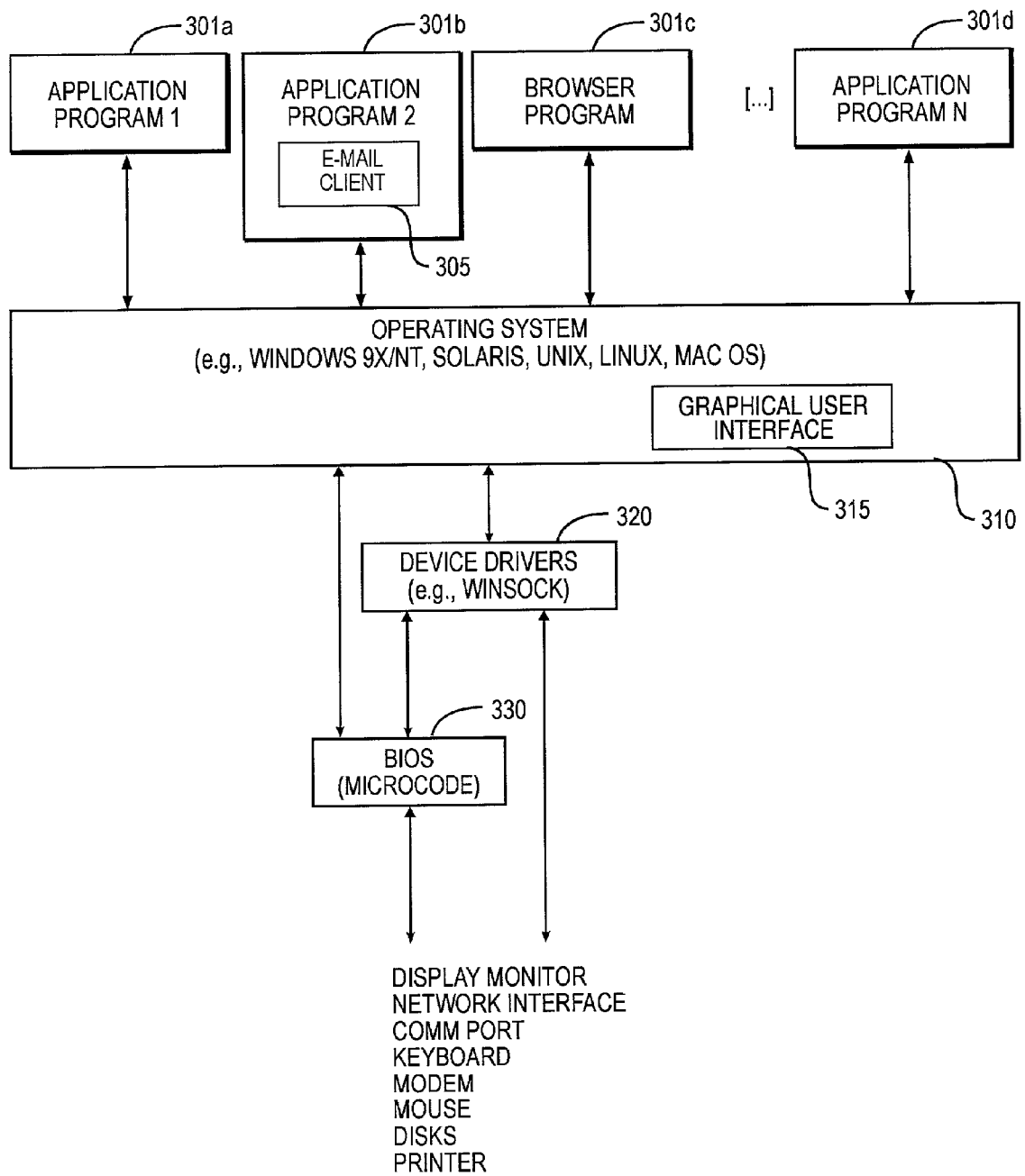
FIG. 3 is a block diagram of a basic software/firmware system suitable for controlling operation of the computer system of FIG. 2.

Illustrated in FIG. 3, a computer software system 300 is provided for directing the operation of the computer system 200. Software system 300, which is stored in system memory (RAM) 202 and on fixed storage (e.g., hard disk) 216, includes a kernel or operating system (OS) 310. The OS 310 manages low-level aspects of computer operation, including managing execution of processes, memory allocation, file input and output (I/O), and device I/O. One or more application programs, such as client application software or "programs" 301 (e.g., 301a, 301b, 301c) may be "loaded" (i.e., transferred from fixed storage 216 into memory 202) for execution by the software system 200. For instance, when the system 200 is employed to control a desktop machine, application software 301 includes client e-mail software 305 (e.g., Microsoft Outlook, available from Microsoft Corporation of Redmond, Wash.), as shown. When the system 200 is employed to control a server machine, on the other hand, application software 301 includes mail server software (e.g., Sendmail® for NT).

System 300 includes a graphical user interface (GUI) 315, for receiving user commands and data in a graphical (e.g., "point-and-click") fashion. These inputs, in turn, may be acted upon by the system 200 in accordance with instructions from operating system 310, and/or client application module(s) 301. The GUI 315 also serves to display the results of operation from the OS 310 and application(s) 301, whereupon the user may supply additional inputs or terminate the session. Typically, the OS 310 operates in conjunction with device drivers 320 (e.g., "Winsock" driver) and the system BIOS microcode 330 (i.e., ROM-based microcode), particularly when interfacing with peripheral devices. OS 310 can be provided by a conventional operating system, such as Microsoft® Windows 9x, by Microsoft® Windows NT, or by Microsoft® Windows 2000, all available from Microsoft Corporation of Redmond, Wash. Alternatively, OS 310 can also be an alterative operating system, such as IBM OS/2 (available from IBM of Armonk, N.Y.) or Linux OS (available from several vendors, including the Red Hat distribution of Linux from Red Hat, Inc. of Durham, N.C.).

The above-described computer hardware and software are presented for purposes of illustrating the basic underlying desktop and server computer components that may be employed for implementing the present invention. For purposes of discussion, the following description will present examples in which it will be assumed that there exists an MTA (e.g., sendmail) that communicates with one or more other MTAs (e.g., remote MTAs), as well as other relevant systems (e.g., Composer, which is described below). The present invention, however, is not limited to any particular environment or hardware configuration. In particular, an MTA distinction is not necessary to the invention, but is used to provide a framework for discussion. Instead, the present invention may be implemented in any type of system architecture or processing environment capable of supporting the methodologies of the present invention presented in detail below.

II. Accelerating Mass Mailings

A. Overview of System Components and Basic Operation

Figure 4:
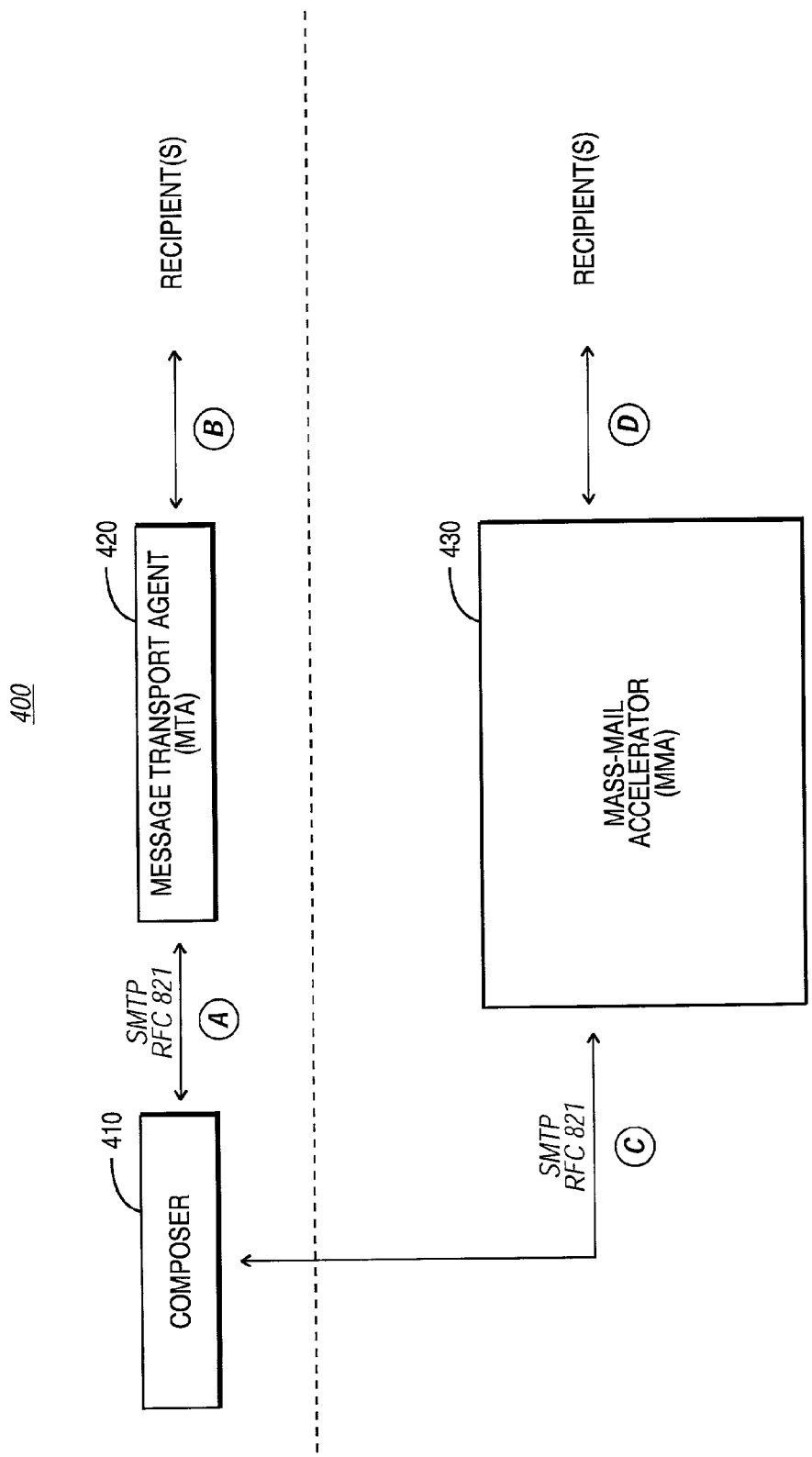
FIG. 4 is a block diagram illustrating a high-level view of an e-mail system in which the present invention may be embodied, including providing a mass-mail accelerator (MMA) component.

FIG. 4 is a block diagram illustrating a high-level view of an e-mail system 400 in which the present invention may be embodied. As shown, the system 400 includes a Composer 410, a message transport agent (MTA) 420, and a mass-mail accelerator (MMA) 430 of the present invention. The Composer 410 is, as described above, a program that operates against a very large database of users to provide large-scale customized e-mail messages by combining different pieces of a message together on a per-user basis. In order to perform this functionality, the Composer 410 takes each constructed message and passes it on to an e-mail system for e-mail delivery to an intended recipient. The Composer 410 ordinarily passes a given message on to an MTA. As shown in the upper half of FIG. 4, for example, the Composer 410 may pass a given message on to the MTA 420 that, in turn, transmits the message to the intended recipient. Here, the Composer 410 passes the message via the SMTP protocol (defined in RFC 821) to the MTA 420, which serves as a mail transport agent to receive e-mail and route that e-mail to a particular destination (if the intended recipient resides at a different domain), or delivers the e-mail to the recipient's local mail box (if the intended recipient resides at the same domain). Thus, in this regard, the upper half of FIG. 4 represents the pre-existing (i.e., unenhanced) approach.

The lower half of FIG. 4 demonstrates that the e-mail system 400 has been modified, in accordance with the present invention, to include the mass-mail accelerator (MMA) 430. Again, the Composer 410 will pass a given message on via SMTP. As shown, however, the Composer 410 now passes a given message on to the MMA 430. As in the case of the MTA 420, the MMA 430 serves to carry out e-mail delivery/routing for the messages that have been passed on to it. However, as described in further detail below, the degree of parallelism on the MTA side of message delivery has been greatly increased.

In order to understand the approach adopted by the MMA 430, it is instructive to first consider the basic transactions that occur in an e-mail system. As shown in FIG. 4, an initial operation or transaction occurs for a given e-mail message, in which the message is transferred from the Composer 410 to the MTA 420 via the SMTP protocol. This transaction is labeled "A" in the figure. Before Transaction A ends, a second transaction must occur: successful delivery of the e-mail message to either its final destination or to an enroute mail server (i.e., another MTA). This transaction is labeled "B" in the figure. Of course, the approach of requiring Transaction B to conclude before Transaction A may conclude sets up a serialized bottleneck that is to be avoided.

In accordance with the present invention, basic operation of the e-mail system is modified as follows. As shown by the transaction labeled "C" in the figure, the transaction for a given e-mail message may instead comprise transferring the message from the Composer 410 to the MMA 430. Now, in contrast to the above, the operation or transaction of recipient delivery, labeled as "D", begins while C is allowed to complete immediately. Thus, an additional instance of C can start while D is in progress. Continuing in this manner, multiple instances of Transaction C may commence regardless of whether corresponding instances of Transaction D have concluded; this approach introduces a pronounced degree of parallelism into the system 400. Further, as described below, the approach may be fine-tuned to further accentuate the degree of parallelism and overall performance that the system may achieve. Notwithstanding these modifications, the system still employs the SMTP protocol between system components. Although the internal operations between Transactions C and D differ substantially from those of Transactions A and B, the internal operations are performed in a manner that is invisible to the SMTP protocol, thereby allowing the improved system to maintain compatibility and simplicity afforded by the SMTP protocol.

B. Connection Caching

In order to improve throughput, the system of the present invention extends the established "connection caching" technique, initially employed in the MTA, to include connections made by the MMA as well. Consider, for instance, a message destined for an AOL user (i.e., a user in the AOL.com domain). The MTA, without the enhancements of the present invention, would simply make a connection to AOL's mail server to deliver that message, and thereafter terminate the connection. However, the act of looking up AOL's mail server (e.g., in a domain name server) and making a connection (e.g., establishing the TCP/IP connection and exchanging the initial protocol commands) is resource-expensive and time-consuming. At the same time, in the process of going through its queue and seeing how much work it has to do, the MTA might discover that it has more than one message destined for the AOL domain. Therefore, instead of terminating the just-made connection to AOL's mail server in the above example, the system of the present invention would keep the connection open for use in a connection cache. More particularly, the connection cache keeps connections open to a configurable number of the most-recently connected-to domains. In the currently-preferred embodiment, the configurable number defaults to five (5); that number may be modified, as desired. In response to this setting, the system keeps the five most-recent connections open, with connections being "aged" or rotated out using a least-recently used (LRU) technique (i.e., the least-recently used items are removed to make room for new entries). Thus, in the foregoing example, if the system encounters a number of messages sent to the AOL domain, the connection cache serves to keep the connection to AOL open, thereby allowing the system to reuse that connection without the expense normally associated with obtaining a connection for a given message.

In a similar manner, the technique can be applied to Domain Name Service (DNS) resolution. Domain Name Service is an Internet service that translates domain names into IP addresses. Domain names are alphabetic, so that they are easier to remember. The Internet, however, is really based on numeric IP addresses. Therefore, every time one employs a domain name, a DNS service must translate the name into the corresponding IP address. In the context of an e-mail system, the e-mail system must query a DNS server to determine the e-mail server for a given domain (e.g., aol.com or a hotmail.com). Again, the process is time-consuming, as the e-mail system must wait for the DNS server to respond. By storing this information in a domain name cache, the e-mail system may avoid repeating the query for already-known domains and thus avoid the delay typically incurred while waiting for the information to be returned from a DNS server.

C. MMA Detailed Architecture

Figure 5:
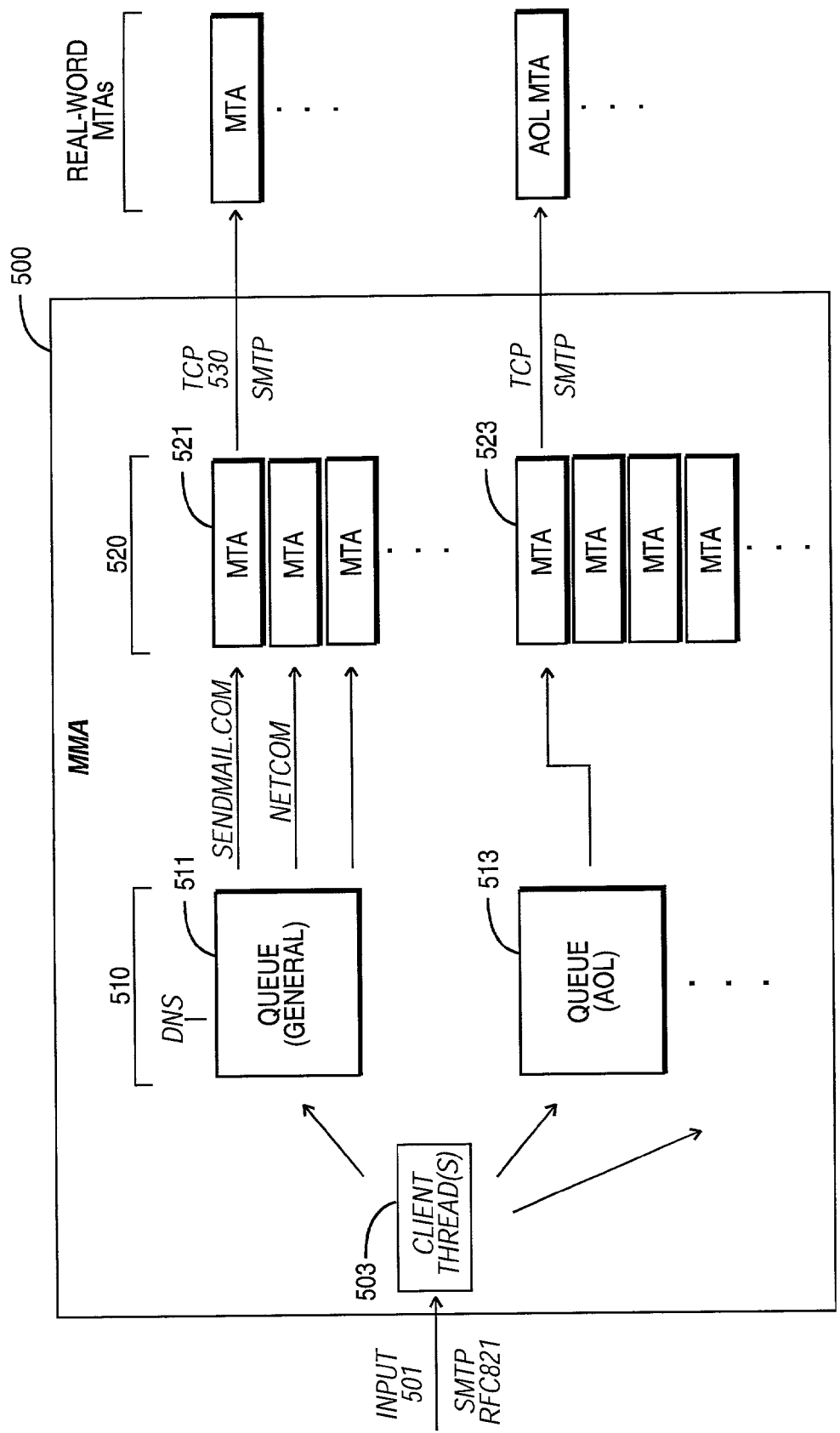
FIG. 5 is a block diagram illustrating the mass-mail accelerator (MMA) component of FIG. 4 in greater detail.

FIG. 5 is a block diagram illustrating the MMA component (now shown at 500) in greater detail. As shown, the MMA 500 receives input (SMTP) 501 that, in turn, is fed into one or more queues 510 (e.g., queue 511, queue 513). Each of the queues, in turn, assigns mail messages to one or more MTA threads, as shown at 520. These features will now be described in further detail.

The input 501 receives, via SMTP, outgoing messages from one or more Composers (previously described). A client thread 503 initially handles this input. In the instance that multiple Composers are connected to the MMA 500 (i.e., multiple concurrent connections), one client thread is assigned to each incoming connection. The respective client thread receives the incoming e-mail message (or simply, "message") and, in turn, decides which queue from the set of queues 510 within the MMA 500 is appropriate to receive and process the message. Although the figure illustrates only two queues, any number of queues may be supported, as desired (and as indicated by the ellipsis). The client thread that receives the message examines the available queues (e.g., queue 511, queue 513) to see which one is appropriate to receive the incoming message.

Each queue itself owns a thread that manages a list of messages. As a particular advantage, the queues themselves are configurable to either be general (generic) or be specific to a particular mail (destination) domain. For instance, a queue may be configured to handle only mail destined for the Hotmail.com domain, or configured to handle only mail destined for the AOL.com domain (e.g., as shown by queue 513). A queue that is specifically configured will only handle e-mail for its specific domain and will not handle any other e-mail. In contrast, a queue may be configured to be generic or general, in which case it will handle e-mail destined for any domain which has no specific queue assigned to it. E-mail posted to a specific queue will not require a Domain Name Services (DNS) look-up, as the MMA 500 already knows (i.e., has cached) the DNS information for the corresponding target e-mail domain. Thus, for example, e-mail destined for the AOL.com domain is posted to the AOL queue 513. The MMA 500 need not look up the DNS information for the AOL.com domain as this information has already been cached as part of the setup for the AOL queue 513. Which queues are created is entirely dependent on the configuration which gives the customer-user (e.g., system administrator) the ability to tailor or tune for a given situation. If, for example, the system administrator knows that about 60% of outgoing e-mail for his or her company is going to AOL, then the system administrator would set up an AOL-specific queue, with corresponding resources.

Each queue manages a pool of MTA threads. For example as illustrated in the figure, the general or generic queue 511 manages MTA threads 521; the AOL queue 513 manages the MTA threads 523. During configuration of the queues, the customer's system administrator may specify the allocation of MTA threads to a given queue. For instance, a system administrator may specify a maximum and/or minimum number of MTA threads that are available to a given queue. When a given MTA thread is started, it establishes a connection out to a real MTA (e.g., remote MTA residing at a particular destination on the Internet). This connection is established using SMTP over a TCP (Transmission Control Protocol) connection, such as TCP connection 530. Via this connection, a given MTA thread may talk SMTP to an actual MTA out in the real world someplace (e.g., AOL MTA).

During MMA operation, once a message has been passed to a queue, that queue examines its MTA threads to see if one is ready to accept the message. If an MTA thread is ready, the queue will assign the message to that MTA thread (which exists inside the MMA 500). Once a message is assigned to an MTA thread, that thread is no longer available and, thus, it marks itself as "busy" (or otherwise removes itself from a "ready" list). The MTA thread proceeds to handle the work of the SMTP exchange between the MMA and the target real-world MTA (e.g., AOL MTA). While a given MTA thread is waiting for a reply from the destination MTA (e.g., AOL MTA), the MMA can proceed to do other work. Thus, for instance, while a given message is being handled by a particular MTA thread, other incoming messages can be injected, queued, requeued, moved around, or the like, within the system.

If, when processing an incoming message, a given queue thread finds all of its MTA threads busy, the queue thread may launch another MTA thread (unless the queue thread has reached a user-specified maximum number of corresponding MTA threads). The newly created thread will then proceed to connect to the destination MTA and attempt delivery. This process of spawning new MTA threads may continue until underlying resources of the base hardware system are exhausted (e.g., system has run out of file descriptors or memory). In instances where no more MTA threads can be created, the system logs corresponding information to a log file, thereby allowing the system administrator to fine-tune the underlying system (e.g., adjust the balance of queue and MTA resources) for the next run.

In contrast to a specific queue, the general or "others" queue is not specific to a particular domain. Thus, the general queue receives messages that are not posted to one of the specific queues. The general queue employs, in addition to a pool of MTAs, the above-mentioned connection-caching technique, including maintaining a list of name server data (i.e., DNS data), as illustrated in FIG. 5. The list reflects mail handlers for given domains that have been recently encountered (e.g., DNS entries for sendmail.com, netcom.com, earthlink.net, or like). The cache will rotate these entries as it needs them, using the aforementioned least-recently used (LRU) connection-caching technique. In this fashion, if the system happens to start getting a lot of mail for a particular domain (e.g., sendmail.com), then the queue's connection to that particular domain can be reused.

Since the general queue talks to domains that are not serviced by a domain-specific queue, its treatment of connections is slightly different because it might need to throw away an old connection in favor of creating a new one to something it has either never talked to, or has not talked to recently. Consider, for instance, the scenario where the general queue is employing a user-specified maximum number of MTAs, which are currently bound to one or more destination MTAs, when a new message arrives that is destined for the domain xyz.com for which the general queue does not have any connection open. In this case, the general queue will shut down an old connection so that it can make a new one (i.e., within the user-specified maximum number of MTAs). Here, the general queue will query a DNS server for the appropriate name server data for the newly-encountered domain. Upon receiving the name server data, the general queue invokes an MTA thread for connecting to the newly-encountered domain, whereupon the MTA thread may transmit the message destined for the xyz.com domain to the real-world MTA for xyz.com. If the general queue encounters a particular domain on a repeated basis, the general queue may post a corresponding entry to the MMA's log file to alert the user that it may be appropriate to establish a specific queue for this particular domain. This information may also be uncovered by performing a database query against the database of recipients, with the results being sorted by domain name.

A queue can be configured to pass messages it cannot complete to some other queue for special handling. This might be caused, for example, by a total network failure between the MMA and a particular destination, such as AOL.com or hotmail.com, as in previous examples. Where this is the case, the queue thread which decides it is unable to complete the delivery will hand the message to its designated "retry" queue, and that queue will attempt to deliver the message using the MTAs and other features available to it. If the initial queue thread has no "retry" queue assigned, the message fails completely, an error is logged, and the message is discarded (or in safe mode, the SMTP submission into the MMA fails).

A particular case of a useful "retry" queue is one which is configured to connect to local MTAs which do nothing but queue messages to disk for later attempts to connect. Such an MTA is said to be operating in "deferred" or "fallback" mode.

D. Detailed Internal Operation

1. Data Structures

Before describing internal methods of operation of the present intention in detail, it is first instructive to review data structures employed within the system. In particular, a "queue" handle is defined to be an instance of the following data structure.

```
 1: /*
 2: ** QUEUE handle, defining a queue of work for assignment to MTAs
 3: */
 4:
 5: struct queue_handle
 6: {
 7:    unsigned  q_randctx;   /* rand_r( ) context */
 8:    u_int     q_mtaid;     /* MTA sequence number */
 9:    u_int     q_initmta;   /* initial MTAs to be created */
10:    u_int     q_maxmta;    /* max. MTAs to be created */
11:    u_int     q_maxfail;   /* max. MTA failures */
12:    u_int     q_maxjobs;   /* max. MTA jobs */
13:    u_int     q_maxqueue;  /* max. queued messages before
14:       creating a new MTA */
15:    u_int     q_flags;     /* flags */
16:    u_int     q_startwait;/* secs to wait for MTA start */
17:    u_int     q_peakmtas;  /* peak MTA count */
18:    u_int     q_peakmsgs;  /* peak MSG count */
19:    u_int     q_mtatimeout;/* MTA timeout (secs) */
20:    u_int     q_batchsize;/* max. rcpts per transaction */
21:    u_int     q_mxlimit;   /* MX record count limit */
22: #ifdef __FFR_THROTTLE
23:    u_int     q_throttle;  /* max. queue length */
24: #endif /* __FFR_THROTTLE */
25: #ifdef __FFR_NEW_TIMEOUTS
26:    u_int     q_mtadatatimeout; /* MTA DATA timeout (secs) */
27:    u_int     q_maxconntime;    /* max. time to connect */
28:    u_int     q_maxtranstime;   /* max. SMTP session time */
29:    u_int     q_maxdelivertime; /* max. time to deliver */
30: #endif /* __FFR_NEW_TIMEOUTS */
31: #ifdef __FFR_MX_HANDLE
32:    u_int     q_mxtimeout; /* max. time to keep MX list */
33: #endif /* __FFR_MX_HANDLE */
34:    u_long    q_msgcount;  /* messages processed */
35: #ifdef __FFR_MAX_MESSAGE_SIZE
36:    u_long    q_maxsize;   /* max. message size */
37: #endif /* __FFR_MAX_MESSAGE_SIZE */
38:    char *    q_name;      /* name of the queue */
39:    Arena     q_arena;     /* arena for memory stuff */
40:    QUEUE     q_retry;     /* pointer to retry queue */
41: #ifdef __FFR_DMS_MANAGER
42:    DNSMGR    q_dnsmgr;    /* DNS manager */
43: #endif /* __FFR_DNS_MANAGER */
44:    Vector    q_mtas;      /* connected MTAs */
45:    Vector    q_ready;     /* MTAs ready for work */
46:    Vector    q_msgs;      /* queued messages */
47:    Vector    q_hosts;     /* hosts for connect( ) */
48:    HashTable q_hosthash;  /* hosts for connect( ) */
49: #ifdef __FFR_TEST_MODE
50:    HashTable q_testmtas;  /* test MTAs */
51: #endif /* __FFR_TEST_MODE */
52: #ifdef __FFR_MX_HASH
53:    HashTable q_mxhash;    /* MX list */
54: #endif /* __FFR_MX_HASH */
55: #ifdef __FFR_DNS_AVOID_DUP
56:    HashTable q_dnsip;     /* DNS queries in progress */
57: #endif /* __FFR_DNS_AVOID_DUP */
58:    pthread_t      q_thread;   /* thread running this queue */
59:    pthread_cond_t q_gotwork;  /* work to do */
60:    pthread_cond_t q_gotmta;   /* MTA now ready */
61:    pthread_mutex_t q_lock;    /* lock for this queue */
62: };
```

As shown, the data structure fully characterizes a given queue (instance). For example, the q_name member specifies a text string for the queue's name. The q_maxsize member specifies the maximum message size handled by the queue instance, and the q_msgcount member records a count of messages handled by the queue instance. The q_thread member indicates the thread running the particular queue instance. Several members specify MTA characteristics associated with a given queue instance. For example, the q_initmta member specifies an initial number of MTA threads to be created for a given queue instance. The q_maxqueue member, on the other hand, indicates the maximum number of messages waiting before a new MTA thread is created to process them. The basic function of other members of the data structure may be discerned from the included programming comments associated with each member.

In a similar manner, data structures may be defined for characterizing a message (object) and MTA (instance), as follows.

```
 1: /*
 2: ** MSG handle, defining a message which has not been processed
 3: */
 4:
 5: struct msg_handle
 6: {
 7:    bool *    msg_success;/* creator's success flag */
 8:    int       msg_flags; /* flags */
 9: #ifdef __FFR_DNS_MANAGER
10:    u_int     msg_dnsretry;/* number of DNS retries */
11: #endif /* __FFR_DNS_MANAGER */
12:    u_int     msg_retries;/* retry count */
13: #ifdef __FFR_DISK_CACHE
14:    u_long    msg_memsize;/* max. in-memory body */
15: #endif /* __FFR_DISK_CACHE */
16:    Arena     msg_arena;  /* memory arena */
17:    char *    msg_jobid;  /* job ID for logging */
18:    char *    msg_client; /* client, from LHLO */
19:    SENDER    msg_sender; /* sender */
20:    Vector    msg_rcpt;   /* RECIPIENT vector */
21: #ifdef __FFR_MTA_HISTORY
22:    Vector    msg_mtahistory; /* MTA history */
23: #endif /* __FFR_MTA_HISTORY */
24:    BODY      msg_body;   /* body */
25:    QUEUE     msg_queue;  /* queue handling this msg */
26:    MTA       msg_mta;    /* MTA handling this msg */
27:    pthread_cond_t * msg_donesig;  /* done signal */
28:    struct timeval msg_queuetime; /* queue time */
29:    struct timeval msg_start;     /* start time */
30: #ifdef __FFR_DNS_MANAGER
31:    struct timeval msg_dnsqueue;  /* queue time */
32:    struct timeval msg_dnsstart;  /* DNS query start time */
33:    struct timeval msg_dnsdone;   /* DNS query done time */
34: #endif /* __FFR_DNS_MANAGER */
35: #ifdef __FFR_NEW_TIMEOUTS
36:    struct timeval msg_aborttime; /* time after which to punt */
37: #endif /* __FER_NEW_TIMEOUTS */
38:    struct timeval msg_done;      /* finish time */
39: };
40:
41: /*
42: ** MTA handle, defining a remote MTA
43: */
```

-continued

```
44:
45: struct mta_handle
46: {
47:     char    mta_name[MAXMTANAME + 1];
/* connected host or prog */
48:     u_int       mta_flags;      /* status */
49:     int         mta_crlf;       /* CRLF handling */
50:     int         mta_infd;       /* input fd */
51:     int         mta_outfd;      /* output fd */
52:     pid_t       mta_pid;        /* pid of child */
53:     int         mta_exstatus;   /* child exit status */
54:     u_long      mta_msgcount;   /* messages handled */
55:     u_int       mta_timeout;    /* input wait timeout */
56: #ifdef _FFR_NEW_TIMEOUTS
57:     u_int       mta_datatimeout;    /* input wait timeout */
58: #endif /* _FFR_NEW_TIMEOUTS */
59:     u_int       mta_failed;     /* failed message count */
60:     HOST        mta_host;       /* HOST handle */
61:     QUEUE       mta_queue;      /* queue to which I belong */
62:     MSG         mta_msg;        /* message I'm working on */
63: #ifdef _FFR_TEST_MODE
64:     TEST        mta_test;       /* TEST handle */
65: #endif /* _FFR_TEST_MODE */
66: #ifdef _FFR_LISTENER
67:     CLIENT      mta_client;     /* CLIENT handle */
68: #endif /* _FFR_LISTENER */
69:     Vector      mta_esmtp;      /* ESMTP services available */
70:     struct in_addr mta_addr;    /* IP address in use */
71:     struct timeval mta_conntime;    /* when connected */
72:     struct timeval mta_lastused;    /* when last used */
73: #ifdef _FFR_NEW_TIMEOUTS
74:     struct timeval mta_aborttime;   /* time after which to abort */
75: #endif /* _FFR_NEW_TIMEOUTS */
76:     pthread_t       mta_thread;     /* thread running this MTA */
77:     pthread_cond_t  mta_gotwork;    /* condition to start work */
78:     pthread_mutex_t mta_lock;       /* structure lock */
79: };
```

As shown, a message (MSG) handle data structure is defined at lines 1–39; it specifies the data members characterizing an incoming message that is to be processed. An MTA handle data structure is defined at lines 41–79, for characterizing a remote or real-world (destination) MTA.

2. Methods of Operation a) Core Operation

Figure 6A:
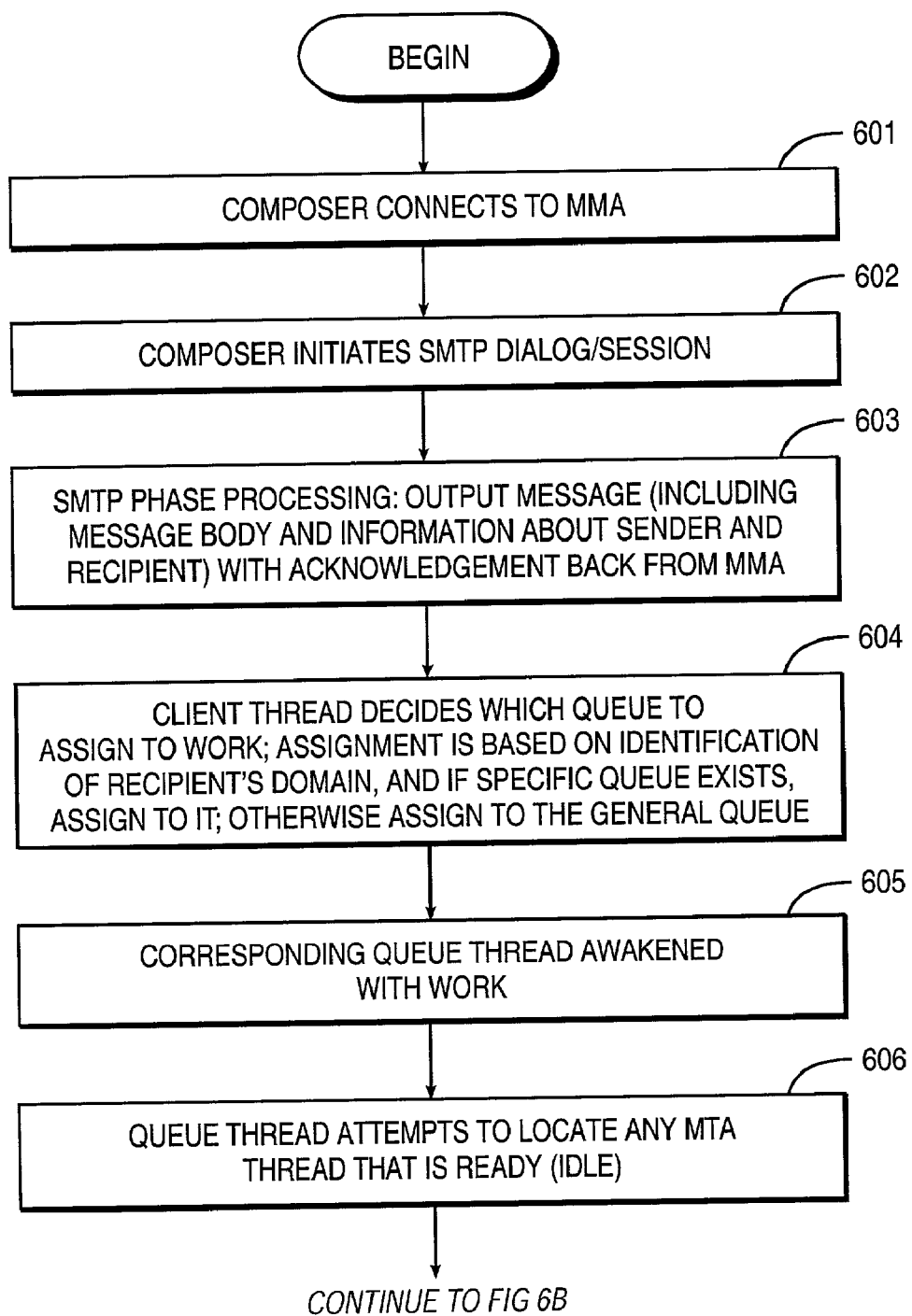
FIGS. 6A–B present a high-level flowchart summarizing an overall method of operation for the MMA.
Figure 6B:
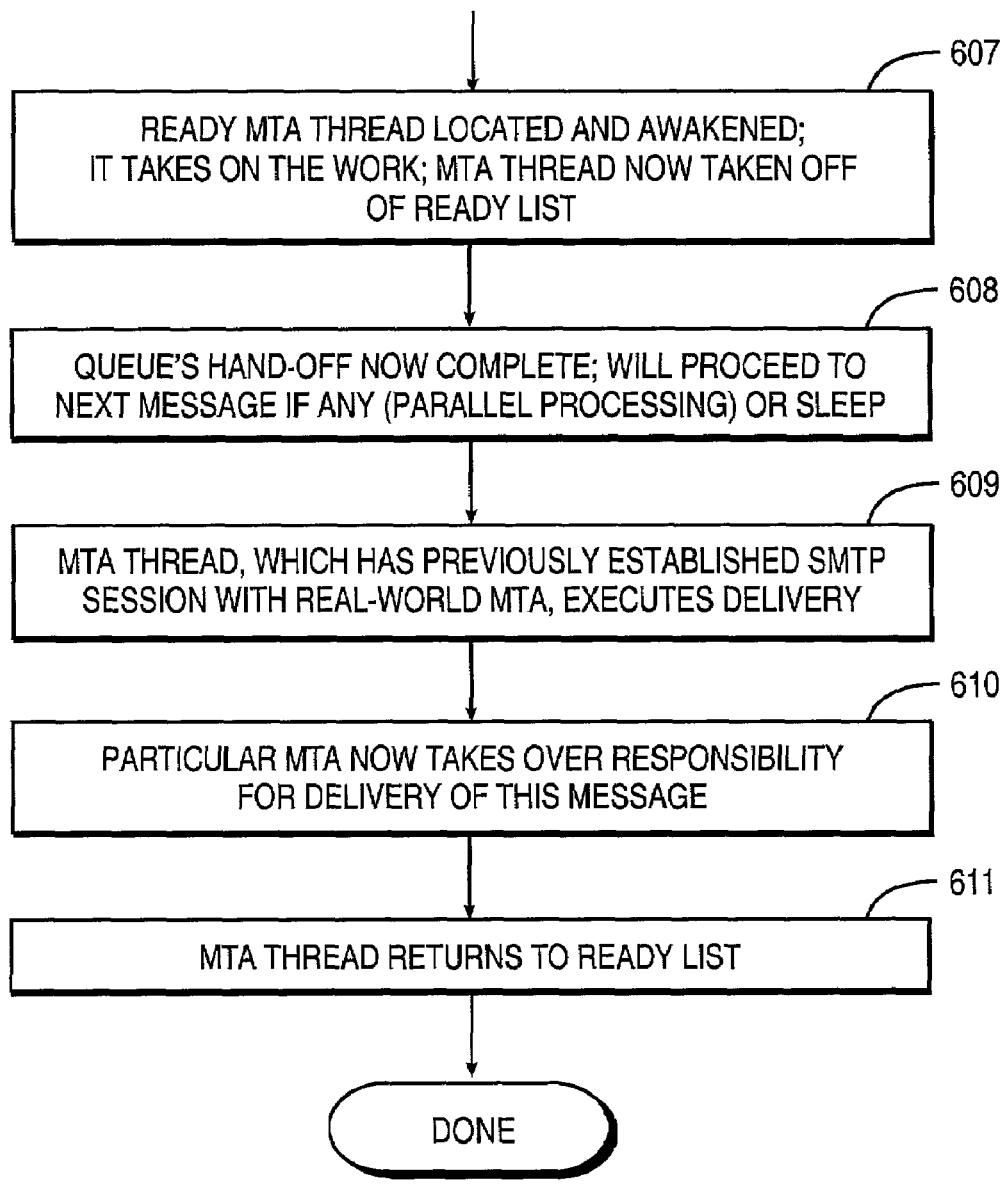

FIGS. 6A–B present a high-level summary of an overall method of operation for the MMA. For simplification of the discussion that follows, the diagram presents a somewhat serial or linear sequence of method steps. However, those skilled in the art will appreciate that processing operations described therein will in fact occur in parallel in the preferred embodiment. Therefore, the flowchart is offered for the purpose of understanding the overall flow of operation, rather than as a representation of the underlying program code's actual execution.

The method begins with the first invocation of the MMA, for instance, from a Composer program that has already started. Here, the Composer will make a connection to the MMA, as shown at step 601. This is done through a UNIX-style pipe, or through a socket (e.g., TCP/IP), or through any other construct/process that allows data to pass back and forth (i.e., supporting interprocess communication). Now, the Composer will begin delivering a message by initiating an SMTP dialog/session with the MMA, as shown in step 602. At step 603, SMTP phase processing begins; this phase is repeated for each message. Here, a given e-mail message is parsed (e.g., for determining its sender, recipient, body, attachments, delivery restrictions, and the like). After the message is parsed, it is ready for delivery. At the completion of the SMTP phase for the first recipient, the MMA now has the message proper (e.g., accessible via a handle) and all of its corresponding parameters required for delivery, and may therefore return an acknowledgment back to the Composer that the message has been successfully received and that the MMA is now ready for more messages.

Operation at this point is controlled based on how the MMA is configured: (1) safe mode or (2) unsafe mode. In safe mode, the MMA will not send an acknowledgement back until the message has passed through the MMA in its entirety—that is, that the message was successfully sent somewhere, such that some other MTA in the world received and accepted responsibility for the message. In other words, in safe mode, only when the MMA successfully sends the message (to another MTA) will it indicate to the Composer that it is ready for more work (i.e., to receive additional messages). Safe mode is provided to comply strictly with the definitions of RFC 821 (SMTP), which guarantees message reliability. However, this atomic transaction-based approach presents a bottleneck to system throughput. As a result, the MMA is also allowed to operate in unsafe mode.

In unsafe mode, the MMA will indicate to the Composer that it is ready for more work regardless of whether the current message has already been successfully sent somewhere. As a result, unsafe mode operates a great deal faster because there is no waiting for confirmation that a given message has been successfully received by another MTA. Although unsafe mode may provide less reliability (e.g., no guarantee of service), the mode operates a great deal faster since the bottleneck of awaiting confirmation is removed, thereby allowing a high degree of parallelism to be realized. The system is user-configurable so that each individual customer can decide which mode is preferred. Given the substantial benefits in performance, however, most users will typically use the unsafe mode of operation. Thus in typical operation, where the system is operating in unsafe mode, step 603 is allowed to loop, or repeatedly execute, for a multitude of messages.

As shown at step 604, each incoming message is received by a client thread, which is listening for incoming messages from the Composer. (The client thread is distinguishable from the "listener" thread, which exists in the MMA only to listen for new connections.) Upon receiving a new incoming message, the client thread decides to which queue or queues it will assign the workload of processing the message. In a typical case, a given message will have only a single recipient. For example, the message may be addressed to an AOL recipient. In that case, the client thread determines whether there are any queues that specifically process AOL messages (i.e., messages destined for the AOL.com domain). If an available specific queue is found, the client thread assigns the message to that queue. Otherwise, the message will be assigned to the general queue, as shown at step 604.

A less common case is a message with multiple recipients. Here, the client thread in effect "clones" the message and assigns the clones to the appropriate queues. For example, if a given message is addressed to an AOL recipient and a xyz recipient, the workload for the AOL recipient is assigned to the AOL queue and the xyz recipient is assigned to the general queue. During this "cloning" process, the message body itself is not needlessly duplicated. Instead, only a single copy of the message body exists. Each clone refers to the message body via a reference handle.

As shown at step 605, the act of assigning work to a queue thread awakens that thread. Upon awakening, a queue thread may now proceed with its assigned work. Specifically, the awakened queue thread looks to see if it has any MTA threads that are ready to handle the job that has been assigned, as shown at step 606. Here, there is a distinction between MTA threads that are running and MTA threads that are ready. In the currently-preferred embodiment, each MTA thread has an "inbox" for receiving a single job at a time. Once a job is placed in the MTA thread's inbox, that MTA thread is removed from the queue thread's list of ready MTA threads, as shown at step 607 in FIG. 6B. Once the work has been passed on to an MTA thread, that work is no longer within the realm of the queue thread. Thus, at that point (step 608), the queue can proceed to see if there is any other work to be processed, or go to sleep waiting for more work.

Having received a new job, the MTA thread, in turn, communicates with a real-world MTA (to which it is connected), using the SMTP protocol, in order to execute the delivery, as shown at step 609. Here, the same set of SMTP commands that the Composer used to post a message to the MMA are, in turn, sent directly to the destination. Now, at step 610, the particular remote (real-world) MTA takes over responsibility for delivery of the message. Once the remote MTA confirms that it will take over responsibility for delivery, the MTA thread (which has handled this message) can now return itself to the "ready" list, as shown at step 611.

b) Exception Case #1: No MTA Threads are Available

Figure 7:
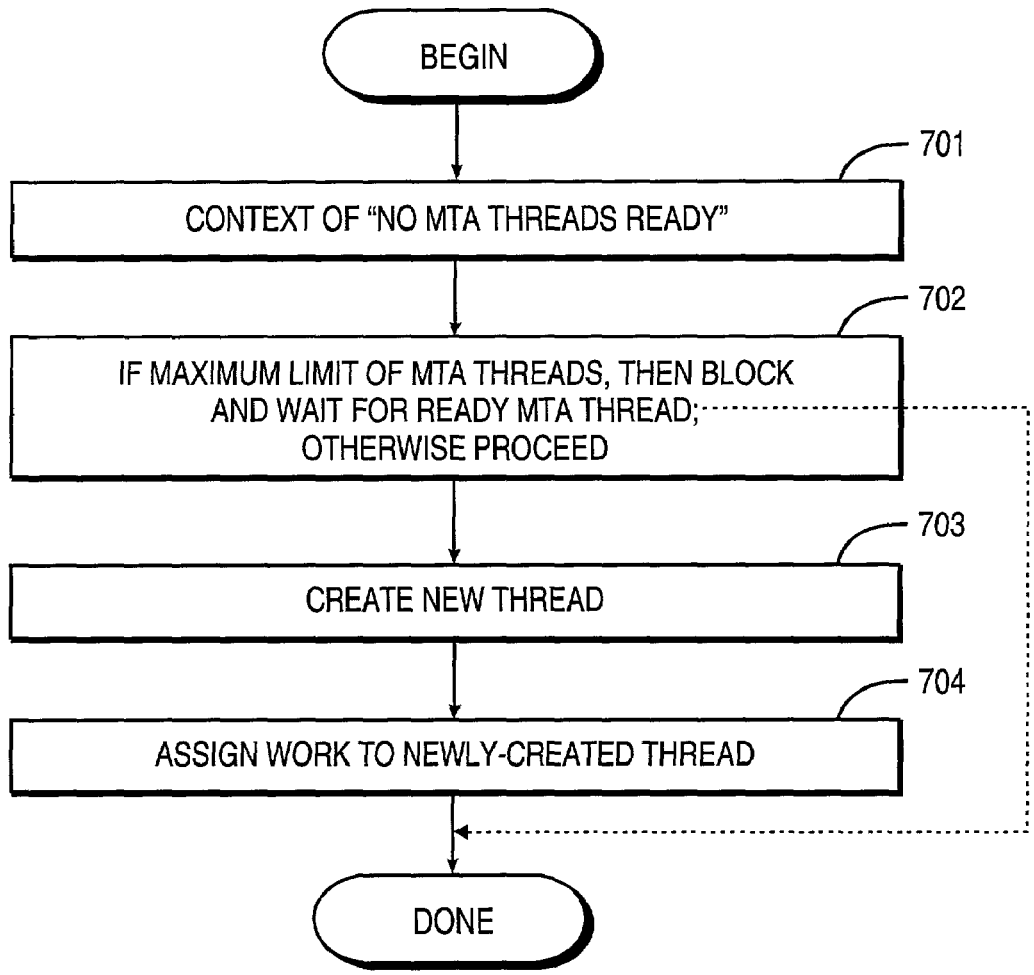
FIG. 7 is a high-level flowchart summarizing exception processing, in the case where no MTA threads are available.

Suppose in step 606 that no MTA threads are available. In that case, processing proceeds as shown in FIG. 7. Step 701 is shown to indicate that these method steps are invoked in the context of "no MTA threads ready." What happens at this point depends on the configuration of the queue, specifically, whether the system is allowed by limits imposed in the configuration to create any more MTA threads. If the system has reached the configuration-specified limit, the method simply blocks and awaits the availability of an MTA thread, as indicated by step 702. However, if it has not reached this maximum limit, the method may proceed to step 703, to create or spawn a new MTA thread. In that case, after step 703, the method will assign the work (of message delivery) to the newly created MTA thread, as shown at step 704. Additionally, the newly created thread becomes part of the general pool that this queue can use. As shown by the foregoing, the system is able to tune itself based on run-time dynamics, such that the system reaches equilibrium, or steady state, where it does not need to create any more threads and the ones that are there are usually busy.

c) Exception Case #2: Error Condition Exists at Remote (Real-World) MTA

Figure 8:
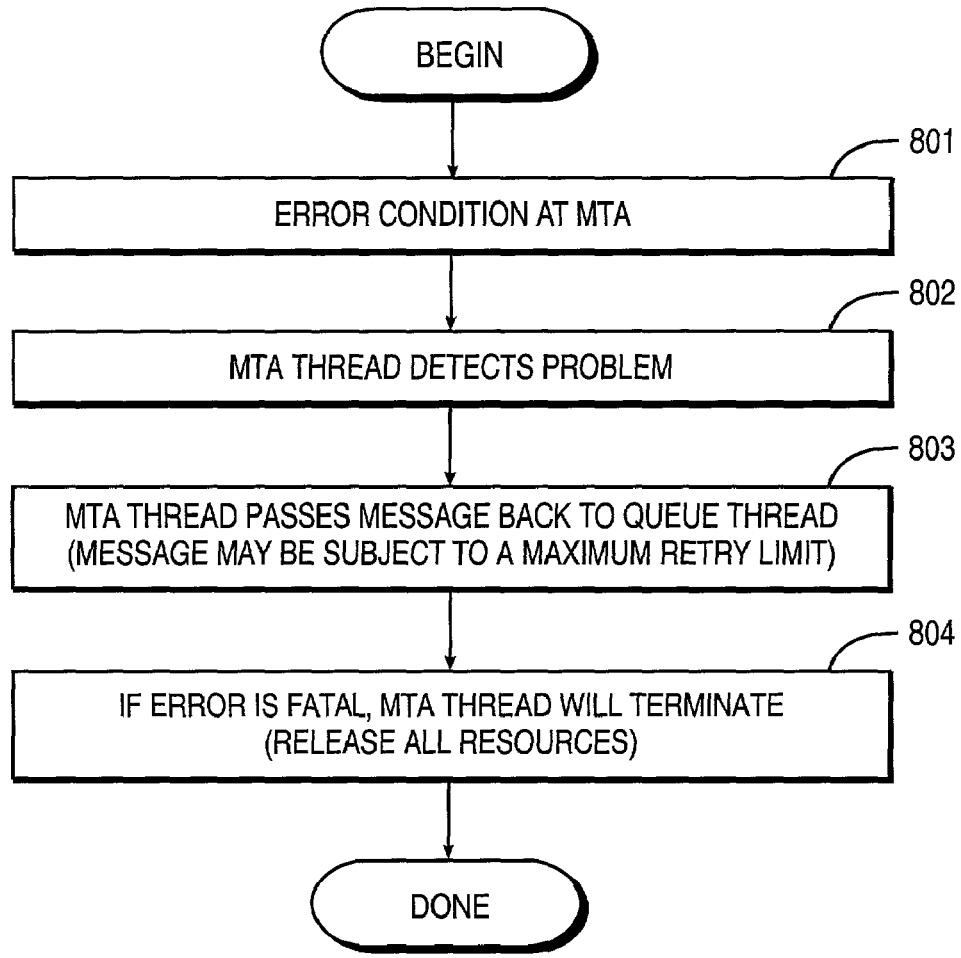
FIG. 8 is a high-level flowchart summarizing exception processing, in the case where an error condition exists at the remote (real-world) MTA.

FIG. 8 illustrates processing in the face of an error condition existing at the remote MTA. Step 801 indicates that an error condition has occurred. The relevant MTA thread detects the error condition, as shown at step 802. The error condition itself may be any one of a number of things, including, for example, abrupt termination of connection, a timeout (i.e., connection is not terminated, but remote MTA does not respond), protocol error (e.g., incorrect SMTP response received), or the like. Upon detecting the error condition, the MTA thread passes responsibility for processing the message back to its corresponding queue, as indicated at step 803. The queue, in turn, reattempts delivery of the message (up to a maximum retry limit, e.g., 10 attempts), for instance by reassigning the message to another MTA thread. If the error condition is fatal, the MTA thread will shut itself down, as indicated by step 804. In this instance, the MTA thread will release its resources, remove itself from the list of "ready" MTA threads, and thereafter terminate. At this point, the queue knows that it has room for one more MTA thread if needed. Note that in the case of a fatal error condition, the message itself has not been lost, as the MMA will reattempt delivery through some other channel (as a result of step 803). If a message cannot be delivered after a maximum number of retries, the system will post a log entry indicating that delivery failed for this recipient.

d) Exception Case #3: MTA Not Available for Domain

Figure 9:
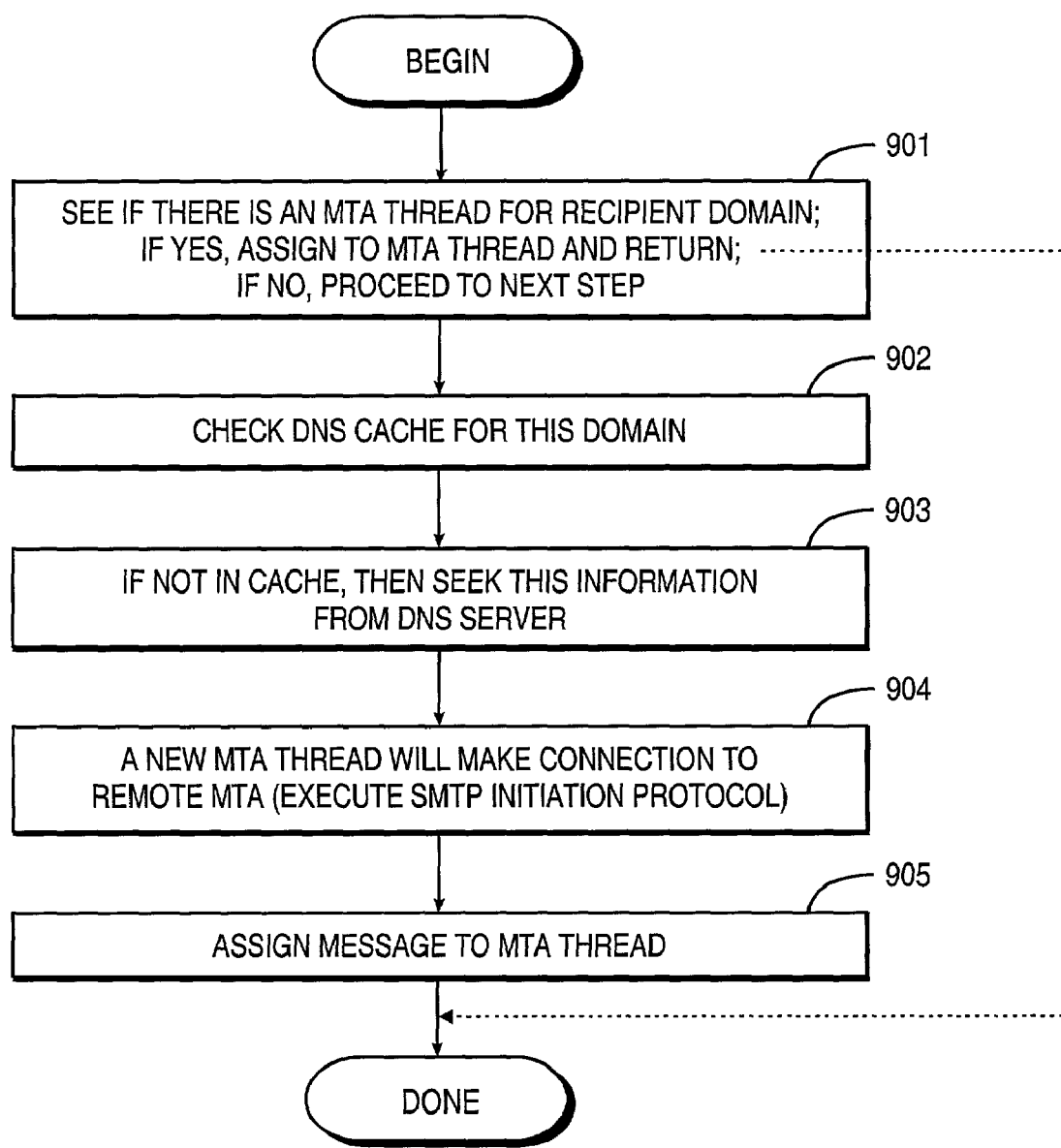
FIG. 9 is a high-level flowchart summarizing exception processing, in the case where an MTA is not available for a given domain.

Recall that the general queue handles all domains for which there is not a specific queue. Thus, the general queue must make sure that there is a real-world MTA available for a particular new domain that is encountered. Consider, for instance, a scenario in which the general queue receives a message destined for the xyz.com domain but it has not opened a connection to the real-world MTA yet. In that instance, the general queue must open such a connection. The processing proceeds as outlined in FIG. 9, which will now be described in detail.

At step 901, the system attempts to locate an MTA thread handling mail for the recipient domain. If one is found, the workload for delivering the message is assigned to that MTA thread (whereupon the method may return). However, if one is not found, the method proceeds to step 902. The method locates the MTA (host) that handles e-mail for this domain. That information may already exist in the DNS cache. Therefore, at step 902, the method checks the DNS cache for an entry corresponding to the domain. If that information is not already stored in the DNS cache, the MMA system must look up that information on the Internet, by querying a DNS server, as indicated by step 903. Two queries are actually performed: a first query for determining which machine handles mail for that domain and a second query for determining that machine's IP address. Once the DNS information is obtained (either from its cache or from querying a DNS server), a new MTA thread makes a connection to the real-world MTA that handles mail for the recipient domain, at step 904, including performing the initial SMTP handshake. Now, the work can be assigned to the new MTA thread, as indicated at step 905. After message delivery, that MTA thread will remain in the general queue's pool of MTA threads until it is instructed to shut down and make room for something else (e.g., an MTA thread for another domain).

While the invention is described in some detail with specific reference to a single-preferred embodiment and certain alternatives, there is no intent to limit the invention to that particular embodiment or those specific alternatives. For instance, although the currently-preferred embodiment has been described in terms of receiving input originating from a Composer program, the system of the present invention may receive input from any program capable of generating mass e-mailings. There is no requirement that a Composer program be used. All told, those skilled in the art will appreciate that modifications may be made to the preferred embodiment without departing from the teachings of the present invention.

What is claimed is:

1. In an electronic mail (e-mail) system, a method for processing a plurality of e-mail messages that are being sent to recipients at various destination domains, the method comprising:

establishing a plurality of queues in the system, zero or more of these being specific queues for handling mail to a specific set of domains, and one being a general queue for transferring e-mail to domains not handled by specific queues, each said queue being configured to spawn a number of message transport agents (MTAs) for connecting to available e-mail servers for a given domain, wherein each queue is associated with at least one message transfer agent (MTA) processing thread that establishes a connection with a recipient MTA and at least one queue is associated with a set comprising a plurality of MTA processing threads, wherein said set of MTA processing threads is dynamically configurable for optimizing resources allocated for a given queue so that the number of MTAs spawned for a given domain may exceed the number of the available e-mail servers for that given domain;

receiving at the system a request to process for transfer a plurality of outbound e-mail messages, each e-mail message specifying delivery to at least one recipient at a particular domain; and for each given e-mail message, processing the given e-mail message by:

determining what domain the given e-mail message is destined for, if the determined domain for the given e-mail message is a specific domain handled by a corresponding specific queue, assigning the given e-mail message to the corresponding specific queue for transferring the given e-mail to said specific domain, otherwise assigning the given e-mail message to said general queue, each queue maintaining a "ready" list for assigning the given e-mail message to an MTA that has indicated that it is available for work, and without waiting for confirmation that the given e-mail message has been successfully processed for transfer to another system, proceeding to process the next one of the e-mail messages.

2. The method of claim 1, wherein said system comprises one general queue and optional specific queues.

3. The method of claim 1, wherein said at least one specific queue only handles e-mail messages that are destined for the specific queue's corresponding domain.

4. The method of claim 1, wherein said general queue handles all e-mail messages that are not processed by said at least one specific queue.

5. The method of claim 1, wherein said system receives said plurality of outbound e-mail messages from at least one composer program, which automatically composes e-mail messages based on database information.

6. The method of claim 1, wherein said system receives said plurality of outbound e-mail messages via Simple Mail Transport Protocol (SMTP).

7. The method of claim 1, further comprising:

creating at least one clone e-mail message upon encountering an e-mail message addressed to more than one recipient; and processing each clone for transfer.

8. The method of claim 7, wherein each clone includes a reference to contents for its corresponding e-mail message, so that storage of e-mail contents is not duplicated.

9. The method of claim 1, further comprising:

in the event that a particular e-mail message cannot be successfully processed upon an initial attempt, routing the particular message to another message transport agent (MTA) which is to re-attempt transport.

10. An electronic mail (e-mail) system providing parallel processing of e-mail messages, the system comprising:

a plurality of queues for processing incoming e-mail messages, at least one queue being designated as a specific queue for processing e-mail messages destined for a specific domain, wherein the queues are dynamically configurable at runtime to increase throughput via spawning multiple connections to each e-mail server for said specific domain;

wherein each queue is associated with at least one, processing thread for receiving incoming e-mail messages that are to be transferred to another system, at least one queue being associated with a plurality of processing threads that may be spawned dynamically at runtime for optimizing resources allocated for said at least one queue such that the number of threads that may be spawned for a given domain can exceed the number of available e-mail servers for that given domain, and each incoming e-mail message being assigned to a particular queue based on what domain the incoming e-mail message is destined for; and wherein a given e-mail message is assigned to said specific queue when the given e-mail message is destined for said specific domain.

11. The system of claim 10, wherein each queue controls a set of one or more message transfer agent (MTA) processing threads, each MTA processing threads capable of performing work to transfer an e-mail message to an MTA on another system.

12. The system of claim 11, wherein the actual number of MTA processing threads employed by a given queue is controlled at runtime.

13. The system of claim 11, wherein each MTA processing thread is capable of establishing a connection to an MTA on another system.

14. The system of claim 12, wherein control of the actual number of MTA processing threads employed by a given queue is based, at least in part, on how many e-mail messages are posted to the given queue at runtime.

15. The system of claim 12, wherein control of the actual number of MTA processing threads employed by a given queue is subject to a maximum limit.

16. The system of claim 10, wherein one of said queues comprises a general queue for processing e-mail messages that are destined for other domains.

17. The system of claim 16, wherein said general queue controls a set of message transfer agent (MTA) processing threads, and wherein each said MTA processing thread of the general queue is capable of transferring an e-mail message to an MTA at a domain that is different than other domains for e-mail messages processed by the set.

18. An improved e-mail system, the improvement comprising:

dividing incoming e-mail messages that are to be processed for transfer into different groups, based on what domain each e-mail message is destined for;

establishing a plurality of specific queues and accompanying processing resources for processing transfer of e-mail messages, each said specific queue handling e-mail messages destined for a frequently encountered domain; and establishing at least one general queue and accompanying processing resources for processing transfer of e-mail messages, each said at least one general queue handling e-mail messages destined for less-frequently encountered domains;

wherein each said queue is configured to assign an e-mail message to a message transport agent (MTA) that is available for sending the e-mail message to a given domain, and is configured to create additional MTAs when none are available to accept work, wherein each said additional MTA is dynamically spawned for optimizing resources allocated for a given queue, and wherein the number of MTAs spawned for a given domain may exceed the number of the available e-mail servers for that given domain.

19. The system of claim 18, wherein each queue is associated with a set of one or more message transfer agent (MTA) processing threads, each capable of transferring an e-mail message to recipient's domain.

20. The system of claim 19, wherein the set of MTA processing threads for said first queue is dedicated to transferring e-mail messages only to said frequently encountered domain.

21. The system of claim 19, wherein the set of MTA processing threads for said second queue may transfer e-mail messages to different domains.

22. The system of claim 19, further comprising a connection cache for storing information about connections that have been made to other domains.

* * * * *